July 10, 1934.          J. G. JACKSON          1,965,648
METHOD OF MAKING BAKING PANS
Filed Sept. 12, 1930

Witness:
William P. Kilroy

Inventor:
Joseph G. Jackson

Patented July 10, 1934

1,965,648

UNITED STATES PATENT OFFICE 1,965,648

METHOD OF MAKING BAKING PANS

Joseph G. Jackson, Oak Park, Ill., assignor to Edward Katzinger Company, Chicago, Ill., a corporation of Illinois Application September 12, 1930, Serial No. 481,425

3 Claims. (Cl. 113—120)

This invention relates to baking pans of the tubed type wherein there is a center tube extending upwardly through the pan to create a center hole or aperture in the products baked in the pan.

It is the object of the present invention to provide a pan of this structure wherein the connection between the tube and the bottom of the pan is very greatly strengthened and the exterior surface of the bottom of the pan is perfectly flat without seams or connections projecting therefrom.

With the above and other objects in view, as will be apparent, this invention consists in the construction, combination and arrangement of parts, all as hereinafter more fully described, claimed and illustrated in the accompanying drawing, wherein:

Figure 1:
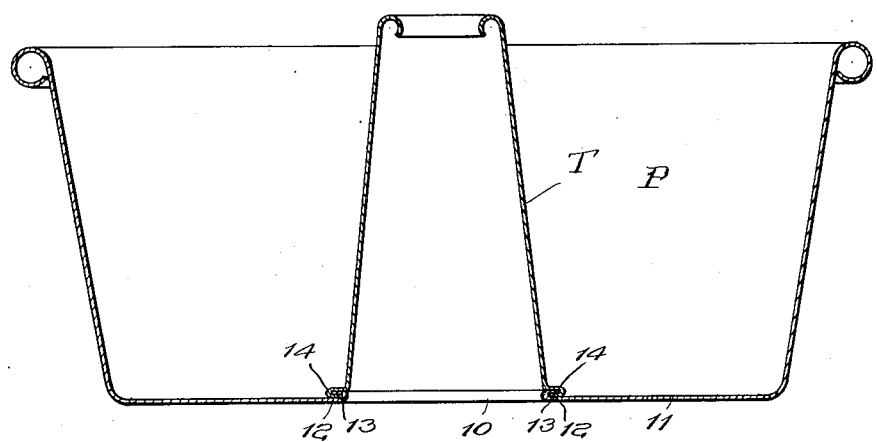
Fig. 1 is a central vertical section through a tubed baking pan constructed in accordance with the present invention.

In the manufacture of tubed cake pans, the tube extends somewhat above the lip or edge of the wall of the pan and in removing the contents of the pan it is frequently stuck upon such projecting end of the tube to loosen and free the contents from the tube and the walls of the pan.

Heretofore pans of this nature have been made with the seam joining the tube to the bottom of the pan so formed that only one thickness of pan bottom is engaged with the tube to support and secure the same in place. As an example of this, one method has been to form a bead adjoining the bottom of the tube which is located on the interior of the pan bottom, a portion of the tube projecting through an aperture provided in the pan bottom. The bead so formed is compressed to rest flush against the interior of the pan bottom while that portion of the tube projecting through the bottom is bent outwardly to rest flush against the exterior face of the pan bottom thereby engaging the edges of the aperture of the pan bottom between the bead of the tube and the end of the tube on the exterior bottom. Another method of attaching the tube to the pan bottom consists of surrounding the aperture in the pan bottom with an outwardly projecting flange and providing the extreme outer terminal of the tube with an outwardly projecting bead, the bead on the tube and the flange on the pan bottom being crimped together. In both of these forms the outer surface of the pan bottom surrounding the aperture has a seam which destroys the smoothness or breaks the plane of the pan bottom and in each case the tube is supported merely by one thickness of the pan bottom. Consequently any impacts on the upper end of the tube are received directly upon one thickness of the pan bottom and eventually loosen the tube and destroy the connection with the pan bottom, for the reason that such impacts all tend to open and loosen the joint or seam between the tube and the pan bottom.

The present invention is designed to create a double seam between the pan bottom and the tube which will be located entirely within the pan. A seam of this character is such that the exterior of the bottom of the pan is smooth and unbroken and the joint between the tube and the pan is firm and secure whereby impacts and blows on the outer end of the tube will be received by at least two thicknesses of pan bottom and will not tend to open or loosen the seam or joint between the tube and the pan bottom.

Reference being had more particularly to the drawing P designates a pan having a central tube T communicating with an aperture 10 in the center of the bottom 11 thereof. The present invention resides entirely in the method and construction of the seam between the tube T and the edges of the aperture 10 in the bottom 11 of the pan P.

Figure 2:
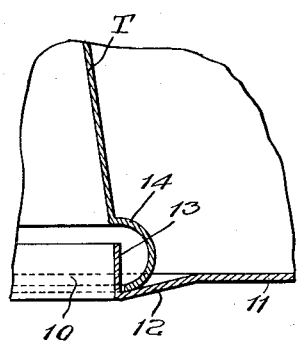
Fig. 2 is a similar fragmentary section through the joint between the tube and the bottom of the cake pan illustrating the preliminary steps in the connection of the tube to the pan.
Figure 3:
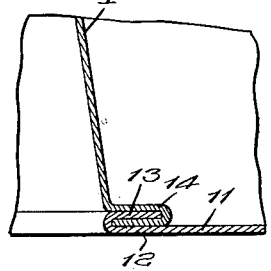
Fig. 3 is a similar section illustrating the completed connection or seam between the tube and pan.

Fig. 2 of the drawing illustrates the assembly of the parts prior to the completion of the seam between the tube T and the pan P; while Fig. 3 illustrates the completed seam or connection between the tube T and the pan bottom 11.

The pan bottom 11 prior to the completion of the seam slopes toward the aperture 10, as at 12, where it terminates in an upstanding flange 13 surrounding the aperture 10 in the pan bottom. The extreme lower end of the tube is provided with an outwardly projecting half bead 14. When the elements are assembled as illustrated in Fig. 2, the half bead 14 rests upon the sloping portion 12 of the bottom 11, while the flange 13 of the bottom extends upwardly somewhat into the half bead 14 terminating just below the joint between the half bead and the body of the tube.

By applying pressure upon the tube or upon the half bead 14, the half bead is flattened out and the flange 13 enters into the half bead 14 while the latter folds upon itself to engage the flange 13 of the bottom between its two opposite sides when so flattened out. Thus the elements assume the positions shown in Fig. 3, the sloping portion 12 of the bottom 11 assuming a position coplanar with the remainder of the bottom 11, while the sides of the half bead 14 assume positions parallel one to the other and to the bottom 11 and engage the flange 13 therebetween.

Thus the exterior face of the bottom 11 is smooth and unbroken by any seams or other means of attachment between the tube and the bottom 11. Furthermore two portions of the bottom 11, to wit the sloping portion 12 and the flange 13, support the tube T and impacts upon the end of the tube tend to strengthen and tighten the joint between the tube T and the bottom 11.

What is claimed is:

1. The method of making and assembling a tubed baking pan, having a tube and a bottom aperture, consisting in sloping the pan bottom outwardly adjoining the aperture and forming an inwardly extending substantially vertical flange at the aperture edge, creating an outstanding bead at the extreme base end of the tube said bead being open at one side, positioning the tube with the edge of the bead resting upon the sloping portion of the pan bottom and against the base of the vertical flange aforesaid said flange extending across the open side of the bead and partly therein, and applying pressure upon the upper side of the bead and to the pan bottom to collapse the bead and force the flange outwardly and position the sloping portion of the pan bottom coplanar with the remainder thereof whereby the bead walls and flange occupy positions substantially parallel to and rest upon the pan bottom.

2. The method of making and assembling a tubed baking pan, having a tube within the pan and a bottom aperture coacting with the tube, consisting in forming an upwardly extending substantially vertical flange at the aperture edge, creating an outstanding bead at the extreme base end of the tube, said bead being open upon the inner side thereof, positioning the tube with the edge of its bead resting on the pan bottom and against the vertical flange aforesaid, whereby the latter extends across the open side of the bead and projects partly therein, and applying pressure upon the upper side of the bead and to the pan bottom to collapse the bead and force the flange outwardly, thereby creating a seam between the tube and pan bottom resting flush against and upon the inner surface of the pan bottom.

3. The method of making and assembling a tubed baking pan having a tube within the pan and a bottom aperture aligned with said tube consisting in forming an inwardly extending flange at the aperture edge substantially at right angles to the pan bottom, creating an outwardly projecting bead at the base end of the tube, said bead being open on the interior of the tube, positioning the tube with the edge of its bead resting upon the pan bottom and against the base of the vertical flange thereof, whereby said flange extends across the open side of the tube, and applying pressure upon the bead and to the pan bottom to collapse the bead and bend the flange outwardly thereby gripped between the sides of the collapsed bead, whereby a seam is created between the tube and pan bottom resting entirely upon the said bottom.

JOSEPH G. JACKSON.